United States Patent [19]

Nakata et al.

[11] Patent Number: 4,589,015
[45] Date of Patent: May 13, 1986

[54] COLOR TELEVISION CAMERA WITH BIAS LIGHT DEVICE FEATURING REDUCED COLOR SHADING

[75] Inventors: Kazuo Nakata; Jun Hosoya; Shigeru Ohshima; Takeshi Sekiguchi, all of Tokyo, Japan

[73] Assignee: Canon Kabushiki Kaisha, Tokyo, Japan

[21] Appl. No.: 499,537

[22] Filed: May 31, 1983

[30] Foreign Application Priority Data

Jun. 2, 1982 [JP] Japan .................. 57-82038[U]
Oct. 14, 1982 [JP] Japan ................. 57-155878[U]
Oct. 14, 1982 [JP] Japan ................. 57-155879[U]

[51] Int. Cl.$^4$ .............. H04N 9/097; H04N 9/09; G02B 27/14
[52] U.S. Cl. ............................ 358/55; 358/50; 350/173
[58] Field of Search ............... 358/55, 50; 350/173

[56] References Cited

U.S. PATENT DOCUMENTS

| | | | |
|---|---|---|---|
| 3,590,145 | 6/1971 | Schneider et al. | 358/55 |
| 4,123,777 | 10/1978 | Sekiguchi | 358/55 |
| 4,216,494 | 8/1980 | Ohshima et al. | 358/55 |
| 4,237,475 | 12/1980 | Sekiguchi | 358/55 |

Primary Examiner—Michael A. Masinick
Assistant Examiner—Randall S. Svihla
Attorney, Agent, or Firm—Fitzpatrick, Cella, Harper & Scinto

[57] ABSTRACT

A television camera is provided with a color resolving optical system for color resolution and for forming a plurality of optical paths, the color resolving optical system having at least one dichroic film, a plurality of image pick-up tubes disposed on the optical paths for receiving the image of an object to be photographed, and an illuminating device emitting a plurality of illuminating lights of a predetermined wavelength range and provided with an adjuster for adjusting the quantity of light of at least one of said illuminating lights. The wavelength band width of said illuminating lights is narrower than the wavelength band width color-resolved by the color resolving optical system and/or the positions at which said illuminating lights are emitted differ from one another, whereby color shading of the image pick-up tubes is eliminated.

8 Claims, 49 Drawing Figures

COLOR TELEVISION CAMERA WITH BIAS LIGHT DEVICE FEATURING REDUCED COLOR SHADING

BACKGROUND OF THE INVENTION

1. Field of the Invention

This invention relates to a television camera containing therein a color resolving optical system having a bias illuminating device.

2. Description of the Prior Art

For example, in an ordinary color television image pick-up device, a color resolving optical system is disposed at the back focal portion of the objective lens and the light beam from an object to be photographed is resolved into three light beams of blue, green and red wavelength ranges by the color resolving optical system and these light beams are caused to enter the light-receiving surfaces of the image pick-up tubes of corresponding color channels, whereby blue, green and red images of the object are formed on the light-receiving surfaces. As the color resolving optical system, use is usually made of a plurality of prisms or glass plates each having deposited thereon by evaporation a multi-layer interference thin film reflecting a light of a particular wavelength range and transmitting therethrough lights of the other wavelength ranges, i.e., a so-called dichroic film, the prisms or glass plates being disposed obliquely with respect to the optical axis of the objective lens. For example, by successively disposing a dichroic film reflecting the blue wavelength light and transmitting therethrough the other wavelength lights and a dichroic film reflecting the red wavelength light and transmitting therethrough the other wavelength lights, and causing the lights reflected by and transmitted through the dichroic films to enter the light-receiving surfaces of the image pickup tubes, the light beam for the object can be resolved into the aforementioned light beams of three colors.

Popular materials of the light-receiving surfaces of the image pick-up tubes include lead oxide (PbO), arsenic selenide ($AsSe_2$), cadmium selenide (CdSe), etc., and in a television camera adopting these, it is effective to normally irradiate the image pick-up tube surfaces with a bias illuminating light of low illumination and having a uniform wavelength distribution in order to improve the response speed and afterimage characteristics of the image pick-up tubes during the rising response interval thereof.

FIG. 1B of the accompanying drawings depicts a structure in which a bias light is applied from a portion of a color resolving prism, and this Figure shows the form of the color resolving prism of FIG. 1A of the accompanying drawings as sectioned on the optical axis, which is also the optical axis of objective lens 1 in both figures. In FIG. 1B, reference numeral 2 designates the color resolving prism provided with an internal reflecting surface 4 and cut-away portions 4', 4" at the corners thereof. The reflecting surface 4, as shown in FIG. 1A, is a diffusing-reflecting surface extending about the optical axis while, on the other hand, the surfaces 4' and 4" forming the cut-away portions are diffusing-transmitting surfaces. Designated by 5 is an illuminating light source which may be, for example, a tungsten lamp. Reference character 6a designates a color temperature converting filter, reference character 6b denotes a quantity of light adjusting filter, and reference numeral 7 designates a reflecting mirror provided with a bent surface.

The light beam emitted from the illuminating light source 5 passes through the two filters 6a and 6b and is reflected by the reflecting mirror 7, and part of the reflected light passes through the cutaway surface 4' and is reflected by or transmitted through the dichroic film, whereafter it enters the image pick-up surface 3' of each image pick-up tube 3. The other part of the reflected light passes through the cut-away surface 4" and is reflected by the diffusing-reflecting surface 4, and then likewise enters the image pick-up surface 3'. It is for the purpose of correcting the non-uniformity of the illumination that the image pick-up surface is irradiated from above and below the optical axis. The filters used in the above-described bias illuminating structure are disposed to supply bias lights of moderate proportions to the image pick-up tubes 3B, 3G and 3R, but where the bias light supplied to a certain image pick-up tube is insufficient, a difference is created in the afterimage reducing effect, which in turn leads to the inconvenience that the afterimage is tinged with colors. Further, the lamp used as the illuminating light source, the color temperature converting filter, the color resolving optical system, etc. have irregularities of spectral distribution due to manufacturing errors, or variations in the lamp with time and variations in spectral distribution as a result of interchanging components of the system can be introduced and therefore, it is very difficult to adjust or balance the bias illumination into an optimum condition.

A method for solving this problem is to dispose individual bias illuminating devices immediately in front of the image pick-up tubes 3B, 3G and 3R, but such method suffers from the difficulty that an extra space suitable for applying a light beam or an extra space in which the illuminating devices are disposed must be prepared or the three illuminating devices must be separately assembled and adjusted.

Even if such difficulty is solved, the dichroic film for color resolution is inclined with respect to the image pick-up optical axis and this leads to color shading. This phenomenon will now be described with an illustration of a bias illuminating device using clad rods. The clad rods 101 shown in FIG. 2A of the accompanying drawings each comprise a glass pillar of high refractive index covered with glass of low refractive index so that light introduced thereinto through one end surface thereof propagates therethrough while repeating total reflection on the boundary surface. Two clad rods 101, 101 are disposed on the upper and lower portions of the front of a color resolving optical system 102, and a portion of each of these clad rods 101 is shaved into a rough surface, which is painted in white to form a diffusing surface 103. The lights of bias lamps 104 having a flat wavelength characteristic are caused to enter these clad rods 101, 101 through the end surfaces thereof and enter the color resolving optical system 102 through the diffusing surfaces 103 as bias lights. The color resolving optical system 102, as shown in FIG. 2B, comprises first, second and third prisms 105, 106 and 107 connected together in the named order from the front, with the rear surfaces of the first and second prisms 105 and 106 being disposed obliquely with respect to the optical axis O of the objective lens, and dichroic films 151 and 161 are provided on these surfaces.

Accordingly, the bias lights emitted from the bias lamps 104 and diffused by the diffusing surfaces 103 enter the color resolving optical system 102. In the color resolving optical system 102, the bias lights first enter the entrance surface 152 of the first prism 105 and, of these incident lights, only the blue wavelength range light is reflected by the dichroic film 151, and this blue wavelength range light is further totally reflected by the entrance surface 152 and enters the light-receiving surface 110b of the image pick-up tube 109b through a trimming filter 108b provided on the exit surface 153 to adjust the condition of the spectral distribution on the light-receiving surface 110b. Also, of the bias lights transmitted through the dichroic film 151, from which the blue wavelength range light has been eliminated, only the red wavelength range light is reflected by the dichroic film 161 of the second prism 106 and is further totally reflected by the boundary surface 162 at the parallel air gap provided between the first prism 105 and the second prism 106, whereafter it passes through the trimming filter 108r on the exit surface 163 and enters the light-receiving surface 110r of the image pick-up tube 109r. The bias light which has been transmitted through the dichroic film 161 and from which the blue wavelength range light and the red wavelength range light have been eliminated is green wavelength range light, and this light passes through the third prism 107 and enters the light-receiving surface 110g of the image pick-up tube 109g through the trimming filter 108g.

In the above-described apparatus of the prior art, observing the quantity of light distribution of the bias lights entering the light-receiving surfaces 110b, 110r and 110g, respectively, of the image pickup tubes 109b, 109r and 109g, the relative quantity of light increases or decreases in a certain direction and that direction differs along the light-receiving surfaces 110b, 110r and 110g. This is because the wavelength selecting characteristic of the dichroic films 151 and 161 depends on the angle of incidence of the light onto these films and the wavelength selecting characteristic varies with a variation in the angle of incidence, and this may cause color irregularity, i.e., color shading, to occur on the screen of the television when use is made of a television camera containing therein a color resolving optical system having a dichroic film.

The color shading will hereinafter be described in detail. In the diffusing surface 103 shown in FIG. 2B of the accompanying drawings, a point on the optical axis O of the objective lens is defined as P, a light ray emergent from the point P so as to pass along the optical axis O is defined as c, and light rays emergent from the point P toward the ends of the light-receiving surfaces 110b, 110r and 110g are defined as u and l. The incident lights of the light rays u, c and l which enter the light-receiving surfaces 110b, 110r and 110g are respectively defined as LBu, LRu, LGu; LBc, LRc, LGc; and LBl, LRl, LGl, and the points of incidence of these lights are defined as Bu, Ru, Gu; Bc, Rc, Gc; and Bl, Rl, Gl. If the light rays u and l have an inclination of angle $\theta$ with respect to the optical axis O and the angles of incidence of the light ray c onto the dichroic films 151 are 161 are $\alpha$ and $\beta$, respectively, then the angles of incidence the light ray u onto the dichroic films 151 and 161 are $(\alpha-\theta)$ and $(\beta+\theta)$ and the angles of incidence of the light ray l onto the dichroic films 151 and 161 are $(\alpha+\theta)$ and $(\beta-\theta)$, and between the angles of incidence of the light rays, u, c and l onto the dichroic films 151 and 161, there are the relations that $(\alpha+\theta)>\alpha>(\alpha-\theta)>0$ and $(\beta+\theta)>\beta>(\beta-\theta)>0$.

FIGS. 3A and 3B of the accompanying drawings are graphs showing the transmitting characteristics of the dichroic films 151 and 161. In these graphs, the ordinate represents transmittivity, the abscissa represents wavelength, the dotted line indicates the transmittivity curve of the light ray u, the solid line indicates the transmittivity curve of the light ray c and the dot-and-dash line indicates the transmittivity curve of the light ray l. As is apparent in these graphs, the light rays l and u, whose angles of incidence onto the dichroic films 151 and 161, respectively, are relatively greater than those of light rays u and l, respectively, tend to be transmitted in relatively shorter wavelengths thereby, while the light rays u and l, whose angles of incidence onto the dichroic films 151 and 161, respectively, are relatively smaller than those of light rays l and u, respectively, tend to be transmitted in relatively longer wavelengths thereby, since the transmitting characteristics of the dichroic filsm 151 and 161 are such that they tend to transmit toward the short wavelength side as the angle of incidence becomes greater. Also, generally, relative to a plane orthogonal to the optical axis O of the objective lens in the color resolving optical system 102, the angle of incidence $\alpha$ onto the dichroic film 151 of the first prism 105 is in the relation that $23°<\alpha<30°$ and the angle of incidence $\beta$ onto the dichroic film 161 of the second prism 106 is in the relation that $10°<\beta<15°$ and thus, the angle of incidence $\alpha$ onto the dichroic film 151 is greater than the angle of incidence $\beta$ onto the dichroic film 161 and therefore, as shown in FIGS. 3A and 3B, the fluctuation of the transmittivity by the wavelength range of the light ray is greater for the first dichroic film 151 than for the second dichroic film 161.

FIGS. 4A, 4B and 4C of the accompanying drawings show the transmitting characteristics of trimming filters 108b, 108g and 108r. In these Figures, the ordinate represents transmittivity and the abscissa represents wavelength. Considering the spectral distributions on the light-receiving surfaces 110b, 110r and 110g on the basis of FIGS. 3 and 4, there are obtained the characteristics shown in FIGS. 5A, 5B and 5C of the accompanying drawings. In FIGS. 5A–5C, the ordinate represents the quantity of light which has reached the light-receiving surface 110b, 110g, 110r, the abscissa represents wavelength, the dotted line indicates the spectral distribution curve of the light ray u on each light-receiving surface 110b, 110g, 110r, the solid line indicates the spectral distribution curve of the light ray c on each light-receiving surface, and the dot-and-dash line indicates the spectral distribution curve of the light ray l on each light-receiving surface. Also, the relative quantity of light at each position of the light-receiving surfaces 110b, 110g and 110r is shown by solid line in FIGS. 6A–6C of the accompanying drawings. According to these Figures, when the bias lights have reached the light-receiving surfaces 110b, 110r and 110g through the prisms 105, 106 and 107, the quantity of light differs depending on the position of incidence thereof and thus, a light-and-dark difference occurs. When the television screen to which these quantities of light are put out after being converted into electrical signals is viewed, there occurs a phenomenon that colors differ at the opposite ends of the screen, and such phenomenon is called the color shading of bias illumination. Also, as described above, the blue wavelength range light and the green wavelength range light near the blue wavelength range create great color shading due to the difference between the angle of incidence of light ray onto the first dichroic film 151 and the angle of incidence of light ray onto the second dichroic film 161, while the red wavelength range light only creates relatively small color shading. Such color shading is not a phenomenon which appears only in the above-described apparatus of the prior art, but is a disadvantage common to all television cameras of the type in which a substantially white bias light source is disposed in front of a color resolving optical system and the bias light is resolved into a plurality of wavelength range lights by the use of the dichroic films in the color resolving optical system, whereafter the lights are directed to the light-receiving surfaces of respective image pick-up tubes. Accordingly, where images of high quality are required, it is desirable to eliminate also the color shading resulting from the difference in inclination between the light rays incident on the dichroic films.

SUMMARY OF THE INVENTION

It is a primary object of the present invention to realize optimum bias illumination.

It is another object of the present invention to set bias light entering each image pick-up tube so as to be of a proper proportion.

It is still another object of the present invention to eliminate color shading.

It is yet still another object of the present invention to provide, in a television camera wherein incident light is resolved into a plurality of color light beams by a color resolving optical system having at least one dichroic film, an illuminating device of bias light in front of the color resolving optical system, said illuminating device providing means for forming color component light beams of narrower wavelength range than the color light beams separated by the color resolving optical system.

It is a further object of the present invention to provide, in a television camera wherein incident light is resolved into a plurality of color light beams by a color resolving optical system having at least one dichroic film, an illuminating device of bias light in front of the color resolving optical system, said illuminating device emitting a plurality of particular wavelength range lights, the position at which these wavelength range lights are emitted being a bias light source disposed at a position for eliminating the color shading of image pick-up tubes.

DESCRIPTION OF THE PREFERRED EMBODIMENTS

Figure 7:
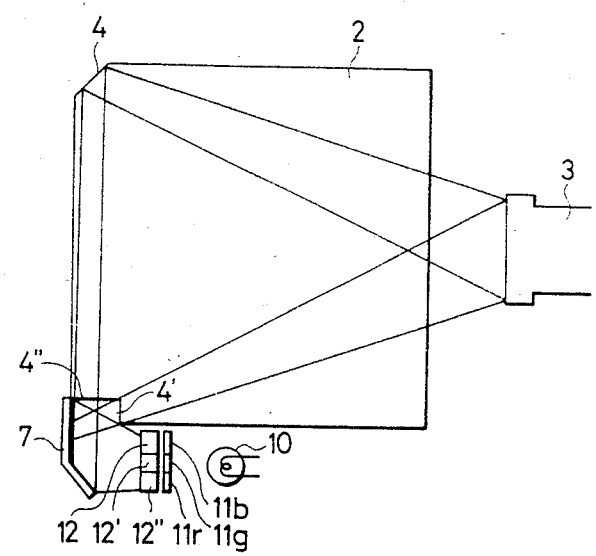
FIG. 7 is a cross-sectional view showing a first embodiment of the present invention.
Figure 8:
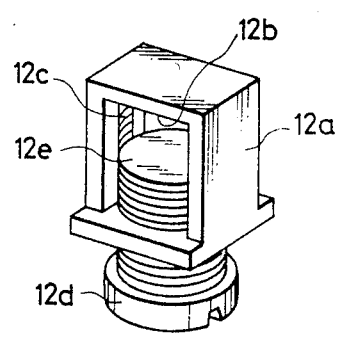
FIGS. 8 and 9 are perspective views showing components of the first embodiment.

Referring to FIG. 7 which shows a first embodiment of the present invention, reference numeral 10 designates a white illuminating light source such as a tungsten lamp. Reference numerals 11b, 11g and 11r denote hue filters which serve to filter blue, green and red wavelength range lights, respectively. These filters 11b, 11g and 11r are disposed between the illuminating light source 10 and a reflecting minnor 7. Reference numerals 12, 12' and 12" designate quantity of light adjusters disposed closely adjacent to one another corresponding to the hue filters 11b, 11g and 11r. These adjusters 12, 12' and 12" have the function of decreasing the lights transmitted through the hue filters 11b, 11g and 11r. As the quantity of light adjusters, use is made of a structure as depicted, for example, in FIG. 8 or 9. In FIG. 8, reference character 12a designates a frame provided with an opening 12b for passing a light beam therethrough and having an internally threaded portion 12c in the inner wall of the opening 12b. Denoted by 12d is an externally threaded portion which threadably engages the internally threaded portion 12c. The top 12e of the externally threaded portion 12d cooperates with the opening 12b to form a variable aperture step and therefore, if the externally threaded portion 12d is moved forwardly or backwardly, the quantity of light can be suitably changed continuously and precisely.

Figure 9:
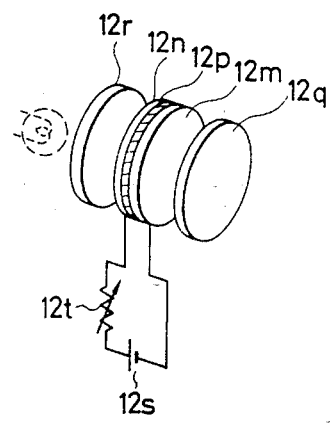

On the other hand, the quantity of light adjuster depicted in FIG. 9 utilizes an electrooptic action. Reference characters 12m and 12n denote transparent electrodes, and reference character 12p designates liquid crystal sandwiched between the transparent electrodes 12m and 12n. Designated by 12q and 12r are a polarizer and an analyzer disposed outwardly of the transparent electrodes. A DC power source 12s and a variable resistor 12t are connected to the transparent electrodes 12m and 12n. Accordingly, if the variable resistor 12t is regulated to vary the voltage applied to the liquid crystal 12p, the overall transmitting characteristic from the polarizer 12q to the analyzer 12r can be varied.

When the quantities of light passed through the quantity of light adjusters 12, 12' and 12" (FIG. 7) are regulated independently of one another and the illuminating light source 10 is turned on, the light beam emitted from the illuminating light source 10 enters the hue filters 11b, 11g and 11r to form blue, green and red color component lights. The component lights enter the corresponding quantity of light adjusters 12, 12' and 12", respectively, whereby the mutual quantities of light are adjusted, whereafter they mix with one another and enter the reflecting surface 7. A part of the light beam reflected by the reflecting surface 7 passes through a transmitting surface 4' to each image pick-up tube 3, and other part of said light beam travels toward each image pick-up tube from the reverse direction via a transmitting surface 4" and a reflecting surface 4. The color component lights can be set so as to be optimum for the corresponding image pick-up tubes and therefore, the adverse effect of an afterimage can be eliminated.

Figure 10:
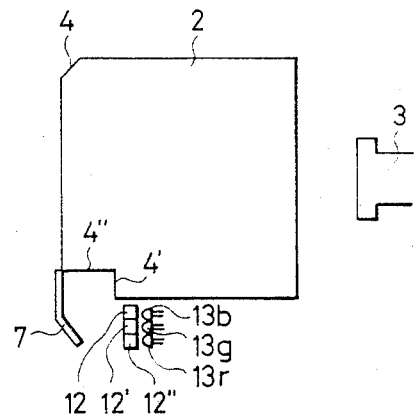
FIGS. 10, 11 nd 12 are cross-sectional views showing further embodiments of the present invention.

FIG. 10 shows another embodiment of the present invention. In FIG. 10, quantity of light adjusters 12, 12' and 12" are similar to those described previously, but light-emitting diodes 13b, 13g and 13r emitting blue, green and red lights, respectively, are disposed instead of the illuminating light source and the hue filters. The color component lights from the light-emitting diodes 13b, 13g and 13r are adjusted into predetermined quantities of light by the quantity of light adjusters 12, 12' and 12" and mix with one another and travel toward the reflecting surface 7. A construction whereby the voltage supplied to each light-emitting diode is changed may be employed instead of the quantity of light adjusters.

Figure 11:
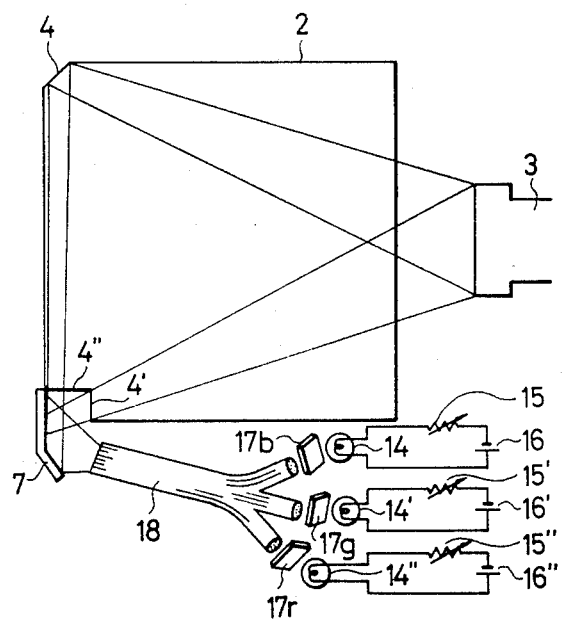

FIG. 11 shows a third embodiment of the present invention. Designated by 14, 14' and 14" are illuminating lamps to which are connected supply circuits for supplying electricity to these illuminating lamps. Designated by 15, 15' and 15" in the supply circuits are variable resistors, and denoted by 16, 16' and 16" are DC power sources. If the variable resistor 15, 15' or 15" is adjusted, the quantity of light emitted from the illuminating lamp can be set to a desired value. Designated by 17b, 17g and 17r are blue, green and red hue filters, and denoted by 18 is an optical fiber bundle whose input side is divided into three bundles and whose output side is arranged in a single bundle. The optical fibers constituting the input side fiber bundles are bundled so as to suitably mix together at the output end. The input side fiber bundles are opposed to the illuminating lamps 14, 14' and 14" with the hue filters 17b 17g and 17r interposed therebetween, and the output end faces a reflecting mirror 7. Accordingly, if the variable resistors 15, 15' and 15" are preset to respective desired values, the light beams emitted from the illuminating lamps 14, 14' and 14" enter the hue filters 17b, 17g and 17r, where the lights are filtered to provide color component lights, which enter the input ends of the optical fiber bundle 18. The three color component lights are transmitted through the optical fiber bundle 18 and travel from the output end toward the reflecting mirror 7 while suitably mixing together.

In the present embodiment, the quantity of light in each color channel can be individually varied by operating the variable resistor connected to each lamp. Also, since the lights are directed by the optical fiber bundle, the lamps may be disposed at any positions and this leads to the advantage that the arrangement of the lamps is not structurally limited. Although not shown, masks are disposed so as to prevent the lights from the illuminating lamps from entering their adjacent hue filter and in addition, the output end of the optical fiber bundle 18 may directly face the cut-away portions 4' and 4" of the prism 2.

Figure 12:
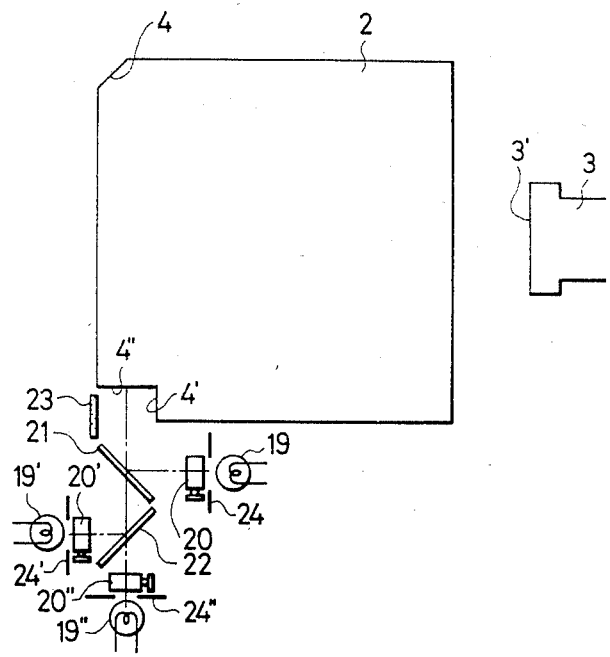

FIG. 12 shows a fourth embodiment of the present invention. Designated by 19, 19' and 19" are white illuminating light sources, and denoted by 20, 20' and 20" are the quantity of light adjusters shown in FIG. 8, for example. Reference numeral 21 designates a first dichroic film for reflecting blue wavelength range light and transmitting green and red wavelength range lights therethrough, and reference numeral 22 denotes a second dichroic film for reflecting red wavelength range light and transmitting at least green wavelength range light therethrough. Designated by 23 is a diffusing-reflecting plate, and denoted by 24, 24' and 24" are masks for preventing the lights from the illuminating light sources 19, 19' and 19" from entering the other than the prescribed members.

Now, the light beam emitted from the illuminating light source 19 and passed through the quantity of light adjuster 20 enters the first dichroic film 21, whereby only the blue wavelength range light is reflected to provide a color component light and a part of the light is reflected by the diffusing-reflecting plate 23 and travels toward the cut-away portions 4' and 4", while other part of the light directly travels toward the cut-away portions 4' and 4". As regards the light emitted from the illuminating light source 19' and passed through the quantity of light adjuster 20', only the red wavelength range light is reflected by the second dichroic film 22 to provide a color component light, which is directly transmitted through the first dichroic film 21 and travels toward the cut-away portions 4' and 4" directly or after reflected by the diffusing-reflecting plate 23. Further, as regards the light emitted from the illuminating light source 19" and passed through the quantity of light adjuster 20", only the green wavelength range light is transmitted through the first and second dichroic films 21 and 22 and reaches the cut-away portions 4' and 4" directly or via the diffusing-reflecting plate 23. The light transmitted through the surface 4' of the cut-away portion illuminates the image pick-up surface 3' of each image pick-up tube 3 while being in its diffused state. The illuminating light sources 19, 19' and 19" cooperate with the first or second dichroic film and as a result, they perform a function similar to that of a light source which emits only blue, red and green wavelength range lights while, on the other hand, respective color component lights can be independently adjusted by the quantity of light adjusters 20, 20' and 20".

Figure 13:
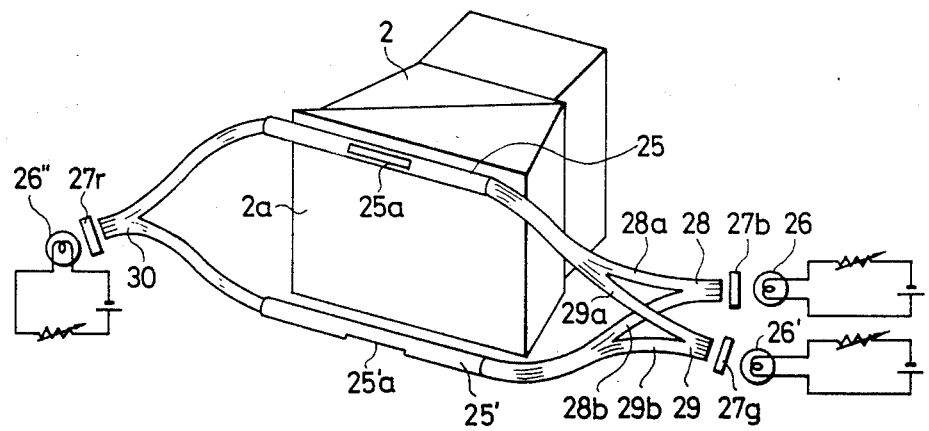
FIG. 13 is a perspective view showing still another embodiment of the present invention.
Figure 14:
FIG. 14 illustrates the actions of the components.

FIG. 13 shows a fifth embodiment of the present invention. In this embodiment, the present invention is applied to the so-called clad rod system using clad rods to effect bias illumination, unlike the mirror system provided with a cut-away portion and a reflecting inclined surface in a color resolving prism. In FIG. 13, reference numerals 25 and 25' designate clad rods disposed outside the imaging light beam coming from an objective lens, not shown, and immediately in front of the entrance surface 2a of a color resolving prism. Each of the clad rods is a glass rod of a diameter of several millimeters consisting of a pillar-like rod of glass of high refractive index coated with glass of low refractive index, and has such a function that when light is introduced thereinto from one end surface thereof, the light is repetitively reflected by the boundary surface and transmitted to the other end surface thereof. If a cut-away portion is provided in a part of the side surface of the clad rod and is subjected to a rough surface treatment as shown in FIG. 14, light incident thereon will be diffused and emerge toward the opposite side thereof.

In FIG. 13, reference characters 25a and 25'a designate such kind of cut-away portions. Denoted by 26, 26' and 26" are illuminating light sources connected to voltage control circuits. Designated by 27b, 27g and 27r are hue filters for filtering blue, green and red lights, respectively. Denoted by 28, 29 and 30 are optical fiber bundles, each of which is a single bundle at the input side and branches off into two bundles at the intermediate portion thereof. Of these optical fiber bundles, the branch bundles 28a and 29a of the fiber bundles 28 and 29 are bundled together and the branch bundles 28b and 29b are also bundled together. The branch bundles 28a and 29a thus bundled together are adhesively secured to one end surface of the clad rod 25, and other branch bundles 28b and 29b thus bundled together are adhesively secured to one end surface of the lower clad rod 25'. Also, as regards the fiber bundle 30, the branch bundles thereof are adhesively secured to the clad rods 25 and 25'.

In the above-described construction, when the light sources 26, 26' and 26" are turned on, the lights emitted from these light sources pass through the hue filters 27b, 27g and 27r, respectively, to provide color component lights which enter the input ends of the fiber bundles 28, 29 and 30, respectively. The blue component light having entered the input end of the optical fiber bundle 28 is supplied to the clad rods 25 and 25' through the branch bundles 28a and 28b, and the green component light having entered the fiber bundle 29 and the red component light having entered the fiber bundle 30 are respectively divided by and transmitted through the branch bundles and supplied to the clad rods 25 and 25'. The color component lights having entered the clad rods 25 and 25' are transmitted therethrough, reach the cut-away portions 25a and 25'a, emerge from the side surfaces thereof, pass through the entrance surface 2a of the color resolving prism 2 and illuminate the image pick-up surfaces of image pick-up tubes, not shown. Here, the voltages applied to the light sources 26, 26' and 26" are individually adjusted by the use of variable resistors, whereby the balance between the quantities of blue, green and red lights of the bias illuminating light can be readily adjusted.

Figure 15:
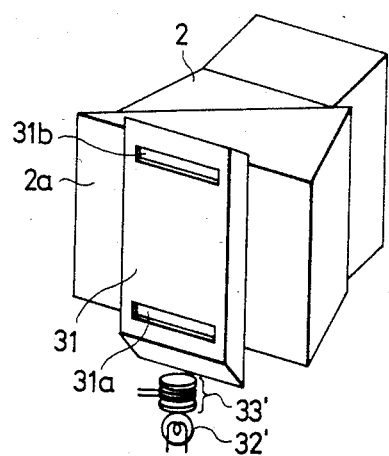
FIGS. 15 and 16 are a perspective view and a cross-sectional view, respectively, showing a further embodiment of the present invention.
Figure 16:
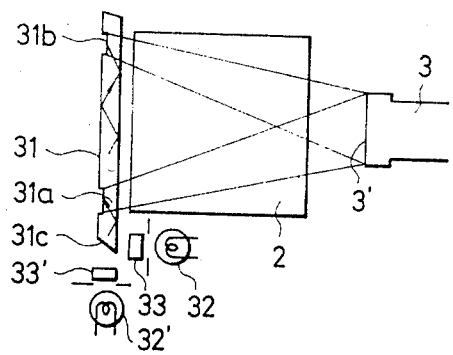

FIGS. 15 and 16 show a sixth embodiment of the present invention. Designated by 31 is a light-transmitting plate provided with diffusing-reflecting depressions 31a and 31b outside the portion of an objective lens, not shown, through which the imaging light beam passes. Reference numerals 32 and 32' designate illuminating light sources, and reference numerals 33 and 33' denote quantity of light adjusters. As the quantity of light adjusters, use may be made of those described in connection with FIG. 8 or 9, but of course, quantity of light adjusters of the type in which voltages are applied to the illuminating light sources may also be employed.

Figure 17:
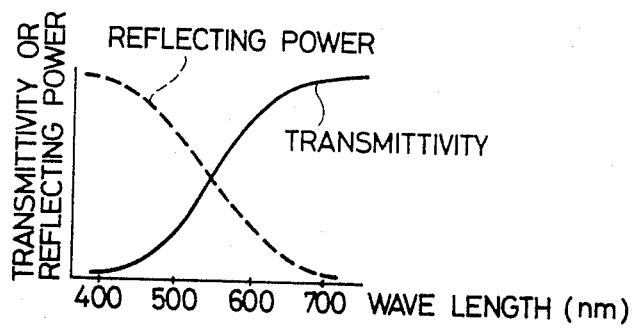
FIG. 17 is a graph showing the characteristic of a dichroic film.

A dichroic film whose characteristic is depicted in FIG. 17 is deposited by evaporation on the input side inclined surface 31c of the light-transmitting plate 31. In FIG. 17, the abscissa represents wavelength and the ordinate represents transmittivity and reflecting power, and the solid line represents the transmittivity curve and the broken line represents the reflecting power curve.

Now, the light emitted from the illuminating light source 32 passes through the quantity of light adjuster 33, whereafter it enters the light-transmitting plate 31 and further enters the inclined surface 31c provided with a dichroic film, and is reflected as a light having the characteristic indicated by the broken line in FIG. 17 and travels through the light-transmitting plate 31 while being totally reflected. Also, the light emitted from the illuminating light source 32' and passed through the quantity of light adjuster 33' to the dichroic film 31c is transmitted therethrough and given the characteristic indicated by the solid line in FIG. 17.

Each color component light travelling through the light-transmitting plate 31 is diffused when it reaches the diffusing surfaces 31a and 31b, and emerges from the opposite side surface and enters the entrance surface 2a of a color dispersing prism 2 and passes through the prism 2 and bias-illuminates each image pick-up tube. The proportion of the lights having the quantity of light distributions as indicated by the solid line and broken line in FIG. 17 can be varied by adjusting the quantity of light adjusters and therefore, the proportion of blue and red of the bias illuminating light can be adjusted. In the present embodiment, it is difficult to keep a strict balance of the quantity of light as in the embodiments already described, but the effect of much reducing the afterimage as compared with the method according to the prior art can be achieved. As the quantity of light adjusters, ND filters in which density varies continuously may be additionally disposed immediately in front of the light sources and such filters may be shifted in position to thereby vary the quantity of light. In the embodiments hitherto described, a prism has been shown as an example of the color resolving optical system, but such optical system is not limited to one comprising a dichroic mirror or the type comprising a combination of a dichroic mirror and a prism.

Figure 1A:
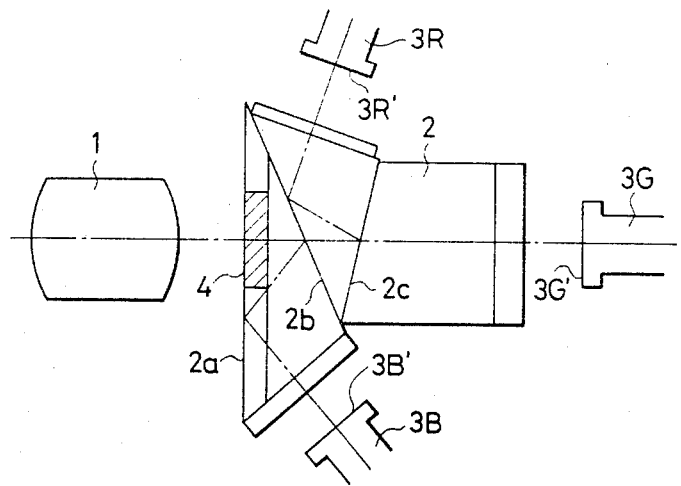
FIG. 1A is a plan view showing the optical system of a television camera according to the prior art.
Figure 1B:
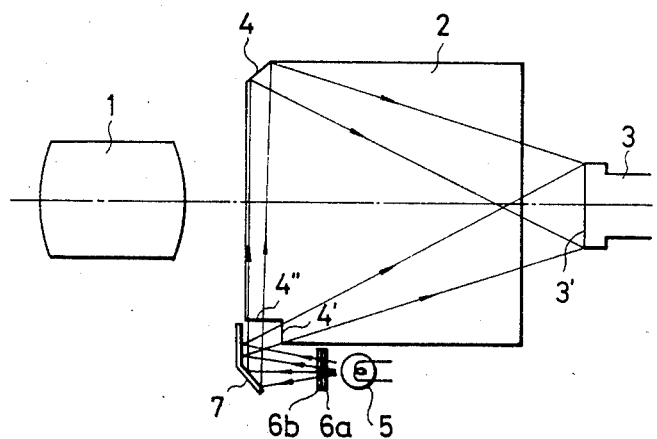
FIG. 1B is a vertical cross-sectional view of the optical system shown in FIG. 1A.
Figure 2A:
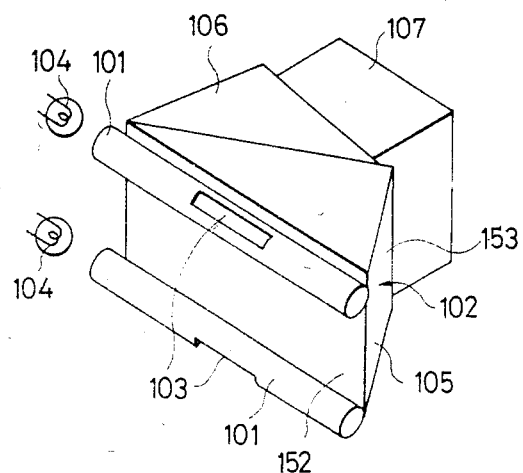
FIG. 2A is a perspective view of a bias illuminating device according to the prior art.
Figure 5A:
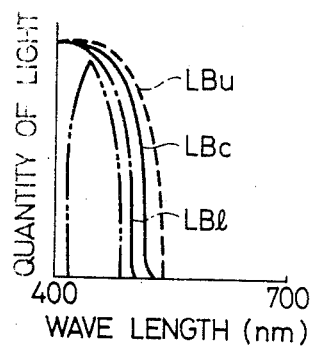
FIGS. 5A–5C are graphs showing the characteristics of the quantities of light reaching the light-receiving surfaces of image pick-up tubes.
Figure 5B:
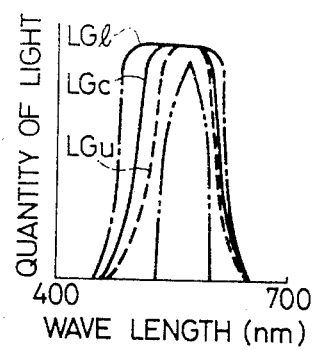
Figure 5C:
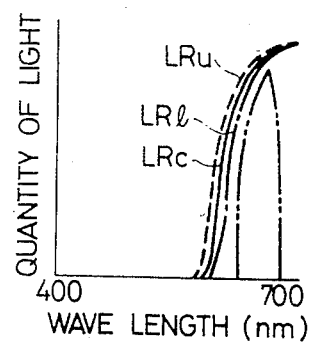
Figure 18:
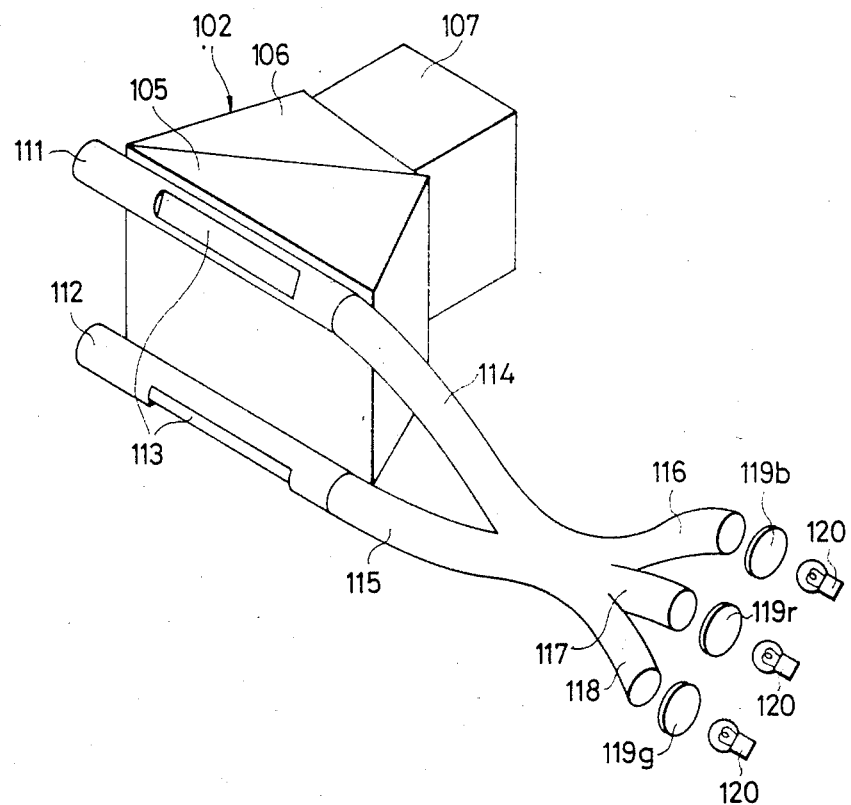
FIG. 18 is a perspective view of a seventh embodiment of the present invention.
Figure 19:
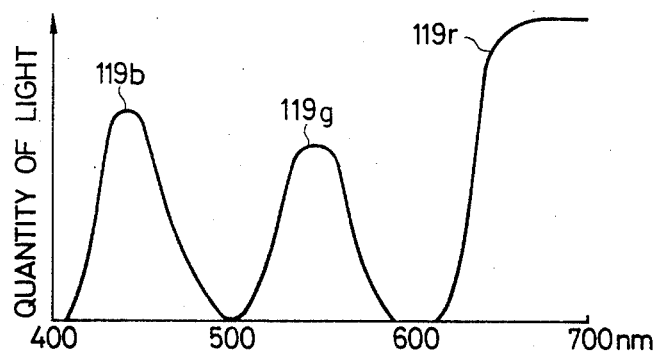
FIG. 19 is a graph showing the spectral transmittivity characteristics of color filters used.

FIG. 18 is a perspective view showing a seventh embodiment of the present invention. Two clad rods 111 and 112 are disposed in front of a color resolving optical system 102 as in FIG. 2A, and each of these clad rods is provided with a diffusing surface 113. Optical fibers 114 and 115 are connected to the ends of the clad rods 111 and 112, respectively, and these optical fibers 114 and 115 are formed into a single bundle, which in turn branches off into three optical fibers 116, 117 and 118. Three color filters 119b, 119r and 119g are disposed adjacent to the light input portions of the ends of the three optical fibers 116, 117 and 118, and three bias lamps 120 are provided corresponding to the color filters 119b, 119r and 119g. The spectral transmittivity characteristics of these color filters 119b, 119r and 119g are shown in FIG. 19, wherein the ordinate represents quantity of light and abscissa represents wavelength. These characterristics have a transmission wavelength range narrow to a degree which does not create such color shading as shown by the dots-and-dash lines including all the light rays in FIGS. 5A–5C which is caused by the difference between the angles of incidence onto the dichroic films, and each of the color filters 119b, 119r and 119g comprises an absorbing filter or a dichroic filter.

Figure 2B:
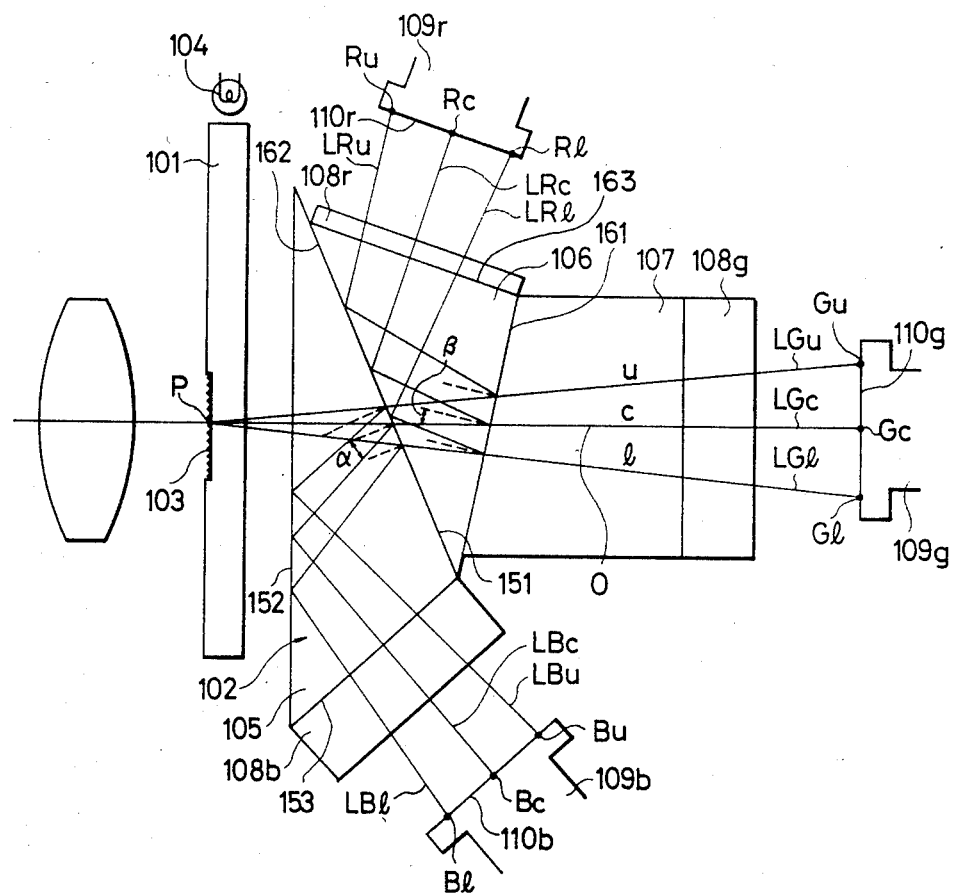
FIG. 2B is a horizontal cross-sectional view of the optical system of a television camera according to the prior art.
Figure 3A:
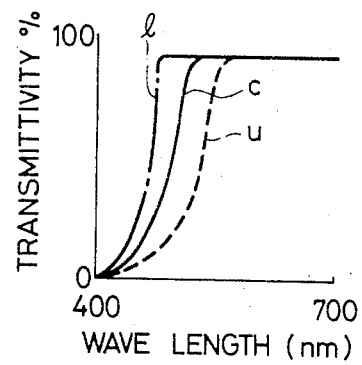
FIGS. 3A and 3B are graphs showing the transmitting characteristics of dichroic films.
Figure 3B:
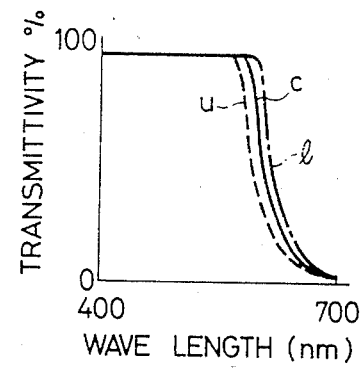
Figure 4A:
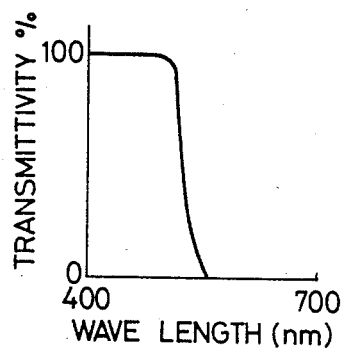
FIGS. 4A–4C are graphs showing the transmitting characteristics of trimming filters.
Figure 4B:
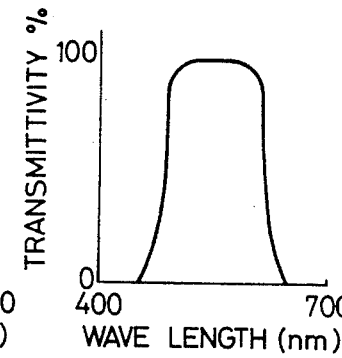
Figure 4C:
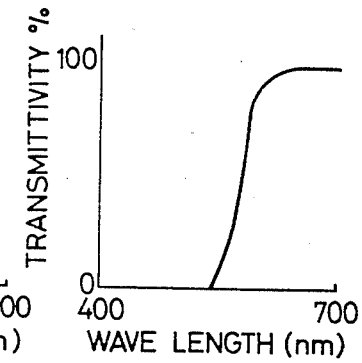

Accordingly, the light rays emitted from the three bias lamps 120 are formed into color component light beams of narrow band of each color by the color filters 119b, 119r and 119g, whereafter they enter the light input portions of the ends of the optical fibers 116, 117 and 118 and propagate through the optical fibers 116, 117 and 118 and are mixed together at the intermediate portion of the optical fibers, and then are directed to the two upper and lower clad rods 111 and 112 by providing an equal quantity of light through both of the optical fibers 114 and 115. These bias lights directed to the clad rods 111 and 112 are diffused by the diffusing surfaces 113 and enter the light-receiving surfaces 110b, 110r and 110g, respectively, of image pick-up tubes 109b, 109r and 109g in a process similar to that in the prior art example shown in FIG. 2B. In this case, however, the bias lights consist of the narrow band wavelength components shown in FIG. 19 which are provided by the color filters 119b, 119r and 119g and therefore, they are not affected by the characteristic created by the difference between the angles of incidence onto the dichroic films 151 and 161 but the relative quantity of light at each point on the light-receiving surfaces 110b, 110r and 110g is averaged as indicated by the dotted line in FIGS. 6A–6C. Accordingly, the bias lights do not provide any irregularity of the quantity of light or any light-and-dark difference on the light-receiving surfaces 110b, 110r and 110g, but uniformly illuminate the light-receiving surfaces 110b, 110r and 110g, thus preventing color shading. That is, the width of the wavelength band of each color component light beam is sufficiently narrow that such light beam will not be split by the dichroic films 151 and 161 and, therefore, each of the color component light beams reaches only one corresponding light-receiving surface.

Figure 20A:
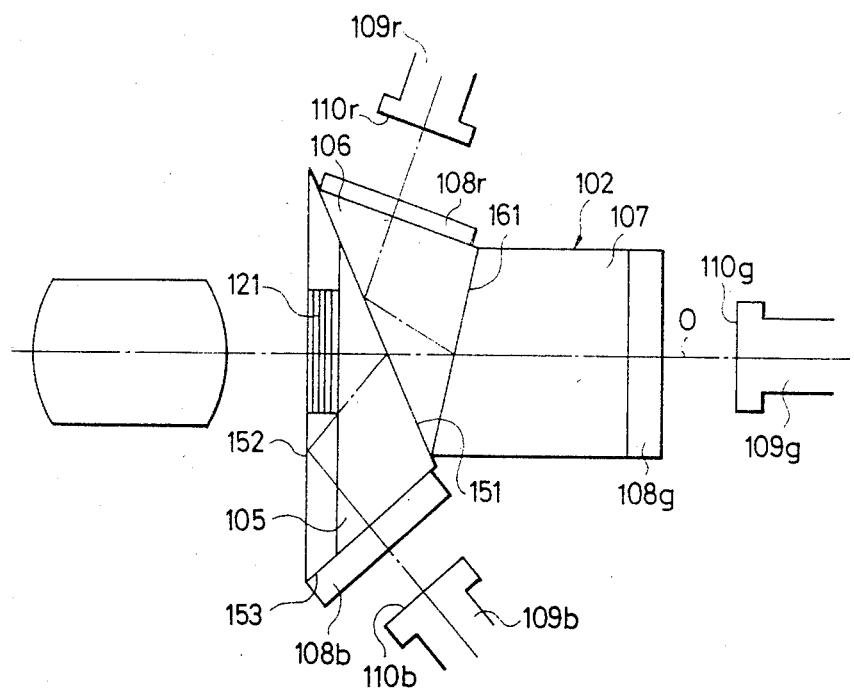
FIG. 20A is a cross-sectional view of an eighth embodiment of the present invention.
Figure 20B:
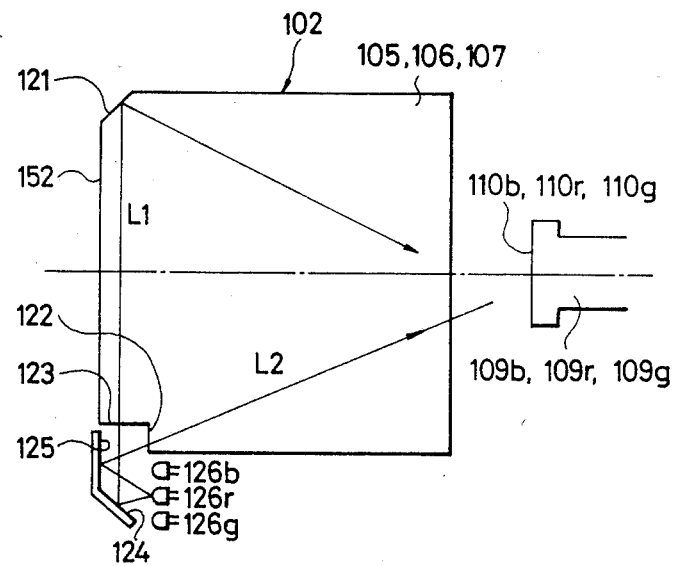
FIG. 20B illustrates the optical path therein.

FIGS. 20A and 20B show an eighth embodiment of the present invention, FIG. 20A being a cross-sectional view taken from thereabove and FIG. 20B being an illustration of the optical path as seen from a side thereof. A first prism 105 of a color resolving optical system 102 is provided with a first diffusing surface 121 formed by obliquely cutting away the upper portion of the entrance surface 152 of the prism 105, and a second diffusing surface 122 and a transmitting surface 123 formed by squarely cutting away the lower portion of the prism 105, and first and second reflecting mirrors 124 and 125 are attached to the lower squarely cut-away portion. LEDs 126b, 126r and 126g emitting only blue, red and green wavelength range lights, respectively, are disposed on the entrance surface side of the reflecting mirrors 124 and 125. These LEDs 126b, 126r and 126g should preferably have a light emission spectrum similar to the dots-and-dash line indicated in FIGS. 5A–5C. As regards the LEDs suitably usable in the present embodiment, the blue light source may comprise chiefly silicon carbide (SiC), gallium nitride (GaN) or zinc sulfide (ZnS), the green light source may comprise chiefly gallium phosphide (GaP) and the red light source may comprise chiefly gallium arsenic phosphide (GaAsP) or gallium phosphide (GaP). The characteristics B, G and R of FIG. 21 indicate the wavelength characteristics of the blue LED, green LED and red LED, and show the light emission spectra of silicon carbide, gallium phosphide and gallium phosphide, respectively.

In the present embodiment, by adopting the above-described construction, the light rays emitted from the LEDs 126b, 126r and 126g are reflected by the first and second reflecting mirrors 124 and 125 and enter the color resolving optical system 102 through the first and second diffusing surfaces 121 and 122. That is, the light beam L1 reflected by the first reflecting mirror 124 passes through the transmitting surface 123 formed in the first prism 105 and is diffused by the upper first diffusing surface 121, and the light beam L2 reflected by the second reflecting mirror 125 is diffused by the second diffusing surface 122. These light beams L1 and L2 are resolved into the wavelengths of blue, green and red lights and enter the light-receiving surfaces 110b, 110r and 110g. In this case, the bias light has a light emission spectrum of narrow band shown in FIG. 21 and therefore, no color shading occurs as in the embodiment of FIG. 18.

Figure 22:
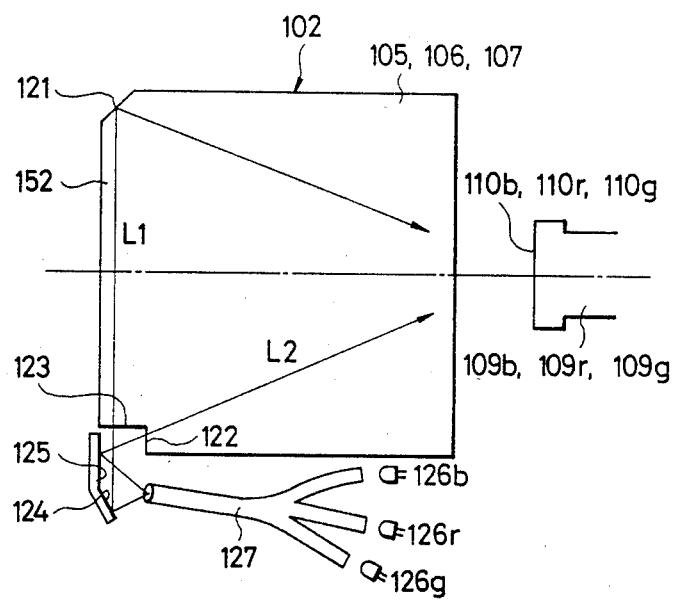
FIG. 22 illustrates the optical path in a ninth embodiment of the present invention.

FIG. 22 illustrates the optical path in a ninth embodiment of the present invention. In this embodiment, an optical fiber 127 formed into a single bundle on the reflecting mirrors 124 and 125 side and branching off into three bundles on the LEDs 126b, 126r and 126g side to provide light input portions is disposed between the first and second reflecting mirrors 124 and 125 and the LEDs 126b, 126r and 126g in the eighth embodiment shown in FIG. 20B. The blue, red and green light beams emitted from the LEDs 126b, 126r and 126g enter the light input portions of the optical fiber 127 and propagate through the optical fiber 127 and irradiate the first and second reflecting mirrors 124 and 125. These bias lights are reflected by the reflecting mirrors 124 and 125, whereafter they travel along an optical path similar to that in the eighth embodiment and reach the light-receiving surfaces 110b, 110r and 110g. This ninth embodiment has the advantage that the limitation in arrangement of the LEDs 126b, 126r and 126g is eliminated.

Figure 23A:
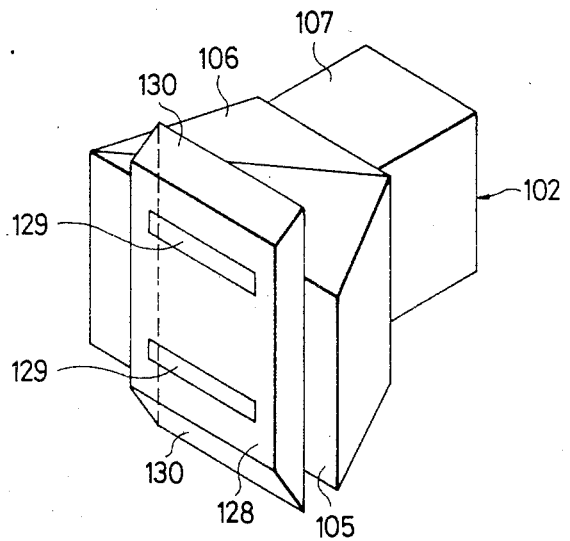
FIG. 23A is a perspective view of a tenth embodiment of the present invention.
Figure 23B:
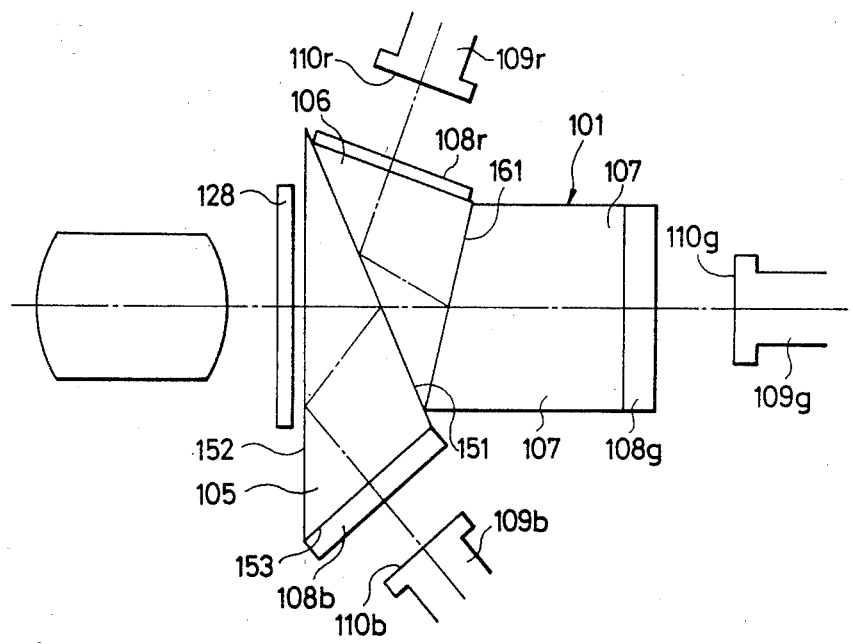
FIG. 23B is a cross-sectional view thereof.
Figure 23C:
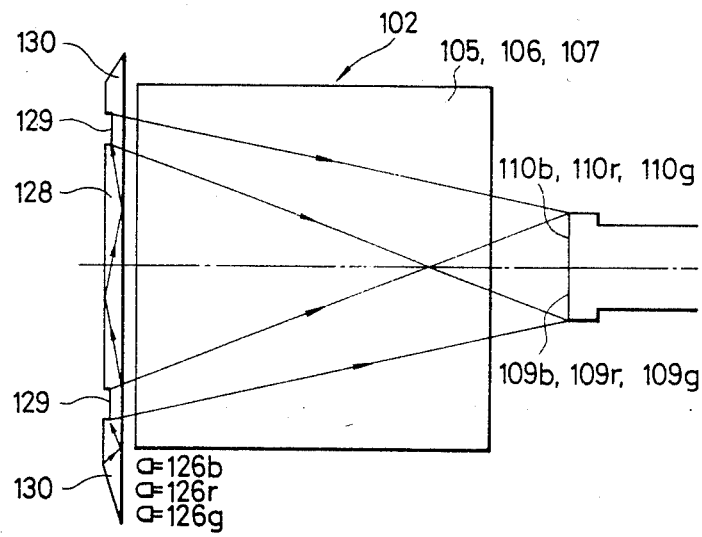
FIG. 23C illustrates the optical path in the tenth embodiment.

FIGS. 23A—23C show a tenth embodiment of the present invention FIG. 23A being a perspective view, FIG. 23B being a cross-sectional view and FIG. 23C being an illustration of the optical path. A bias plate 128 comprising a transparent glass plate transmitting therethrough the light beam from the objective lens is disposed in front of a first prism 105 of a color resolving optical system 102, and the LEDs 126b, 126r and 126g used in the previous embodiment of FIG. 20B are disposed rearwardly of the lower portion of the bias plate 128. Two band-like, parallel diffusing surfaces 129 formed by shaving a portion of the bias plate 128 and applying white paint thereto are provided in the upper and lower portions of the bias plate 128, and the upper and lower ends of the bias plate 128 are formed into inclined portions 130 so that the bias lights entering from the LEDs 126b, 126r and 126g are totally reflected in the bias plate 128.

Blue, green and red wavelength range lights emitted from the LEDs 126b, 126r and 126g enter the bias plate 128 and propagate through the bias plate 128 while being totally reflected therein and impinge on the diffusing surfaces 129, whereby they are diffused in the direction of the color resolving optical system 102. The behavior of the lights after having entered the color resolving optical system 102 is the same as in the previous embodiments, thus preventing color shading.

Figure 24:
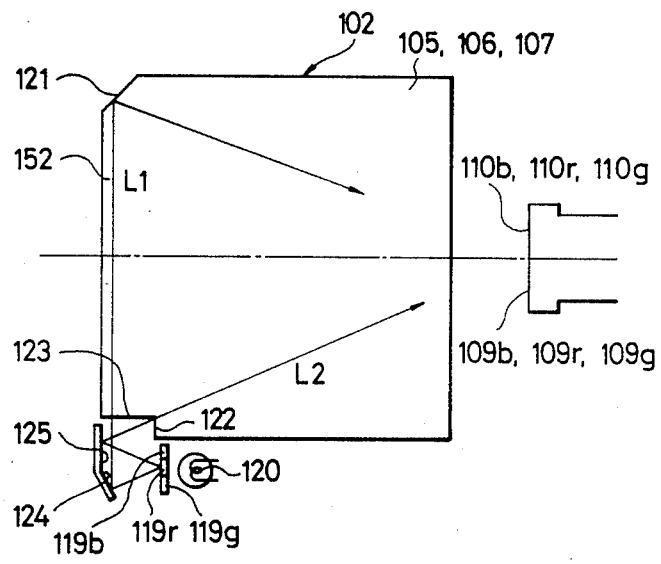
FIG. 24 illustrates the optical path in an eleventh embodiment of the present invention.

FIG. 24 shows the optical path in an eleventh embodiment of the present invention. In the construction of this embodiment, the light source units of bias lights of the eighth embodiment shown in FIG. 20B are modified. That is, a white bias lamp 120 is used instead of the LEDs 126b, 126r and 126g of FIG. 20B and color filters 119b, 119r and 119g are disposed between the bias lamp 120 and first and second reflecting mirrors 124 and 125. These color filters 119b, 119r and 119g have the spectral transmittivity characteristics of the previously described wavelength ranges as shown in FIG. 19 and are arranged in a row.

Figure 21:
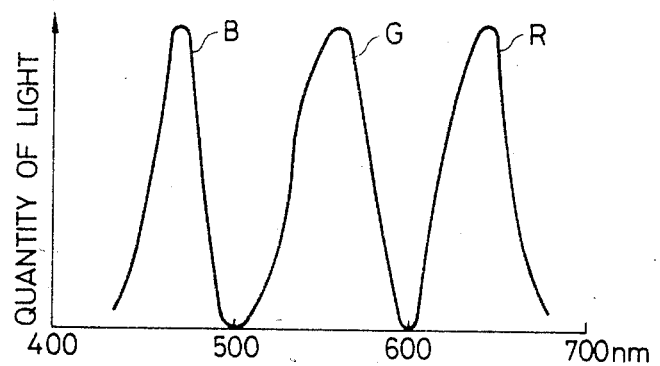
FIG. 21 is a graph showing the light emission spectnum characteristics of LEDs.

The light beam emitted from the bias lamp 120 is formed into component light beams of narrow band as shown in FIG. 21 by the color filters 119b, 119r and 119g, whereafter the component light beams enter the color resolving optical system 102 via the first and second reflecting mirrors 124 and 125 and the first and second diffusing surfaces 121 and 122 and as a result, the color shading by the bias light does not occur.

Figure 25:
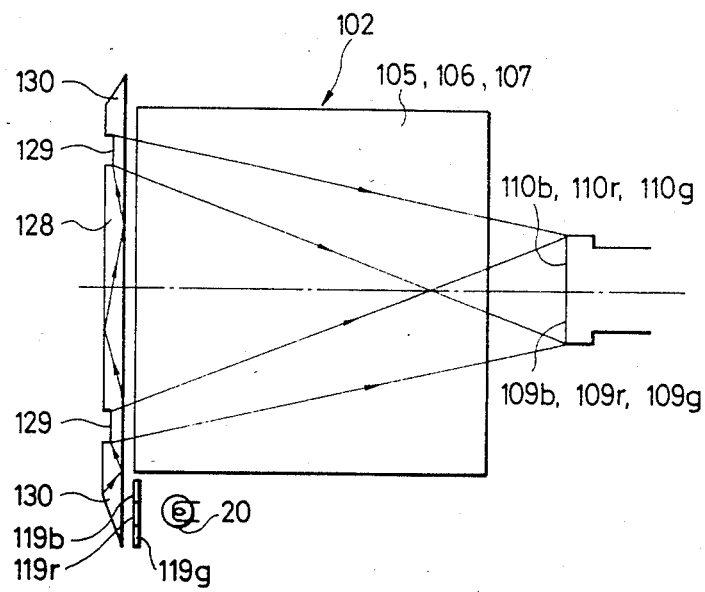
FIG. 25 illustrates the optical path in a twelfth embodiment of the present invention.

FIG. 25 shows the optical path in a twelfth embodiment of the present invention. This embodiment uses the bias plate 128 shown in FIG. 23C and the bias lamp 120 and color filters 119b, 119r and 119g of FIG. 24. Accordingly, the light beam emitted from the bias lamp 120 is formed into component light beams of narrow band by the color filters 119b, 119r and 119g, whereafter the component light beams enter the bias plate 128 and further enter the color resolving optical system 102 as in the embodiment shown in FIG. 23C.

Figure 26A:
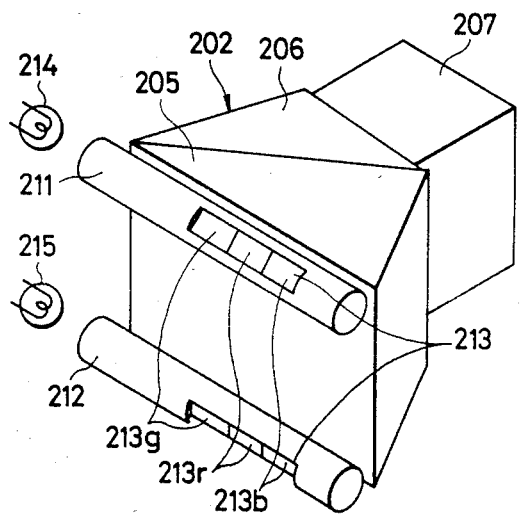
FIG. 26A is a perspective view of a thirteenth embodiment of the present invention.
Figure 26B:
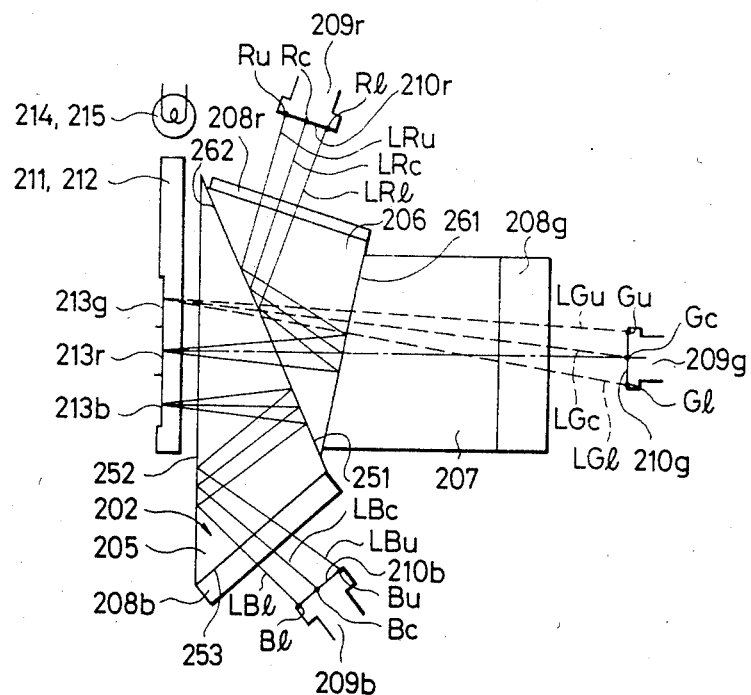
FIG. 26B illustrates the optical path therein.

FIGS. 26A and 26B show a thirteenth embodiment of the present invention, FIG. 26A being a perspective view and FIG. 26B being an illustration of the optical path. Two upper and lower clad rods 211 and 212 are disposed in front of a color resolving optical system 202 as in FIG. 2A and a diffusing surface 213 is formed in each of these clad rods 211 and 212 by shaving a portion thereof, and bias lamps 214 and 215 are disposed adjacent to the ends of the clad rods 211 and 212. Each of the diffusing surfaces 213 is divided into three sections, that is, as viewed from a trimming filter 208r, there are successively provided a green diffusing surface 213g painted in green so as to reflect only the green wavelength range light, a red diffusing surface 213r painted in red so as to reflect only the red wavelength range light, and a blue diffusing surface 213b painted in blue so as to reflect only the blue wavelength range light.

The light beams emitted from the white bias lamps 214 and 215 enter the ends of the clad rods 211 and 212 and, of these light beams, the green wavelength range light is diffused by the green diffusing surfaces 213g, the red wavelength range light is diffused by the red diffusing surfaces 213r, and the blue wavelength range light is diffused by the blue diffusing surfaces 213b, and these lights enter the color resolving optical system 202 through the entrance surface 252 of a first prism 205. The blue light rays LBu, LBc and LBl emergent from the blue diffusing surface 213b are reflected by the dichroic film 251 of a first prism 205 as shown in FIG. 26B, and then are directed to the light-receiving surface 210b of an image pick-up tube 209b. Also, the green wavelength range light and the red wavelength range light travel along the routes shown in FIG. 26B and enter the light-receiving surfaces 210g and 210r, respectively. When the light ray emergent from any position on the blue diffusing surface 213b enters the light-receiving surface 210b, the lengths of the optical paths of the light rays, LBu, LBc and LBl are longer in the named order, and the quantity of light on the light-receiving surface 210b is greater in the order of LBl, LBc and LBu. Also, the angles of incidence of the respective light rays onto the light-receiving surface 210b are greater in the order of the light rays LBu, LBc and LBl and thus, the quantity of light per unit area is greater in the order of LBl, LBc and LBu.

Figure 6A:
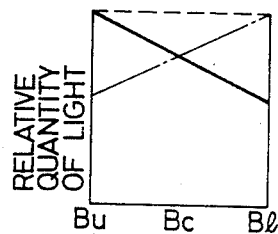
FIGS. 6A–6C show the distributions of the relative quantities of light at the positions of the light-receiving surfaces of image pick-up tubes.
Figure 6B:
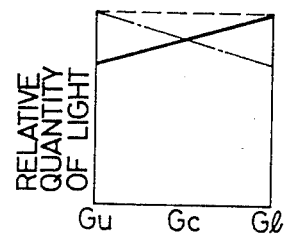
Figure 6C:
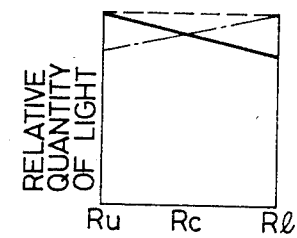
Figures 27A, 27B, 27C:
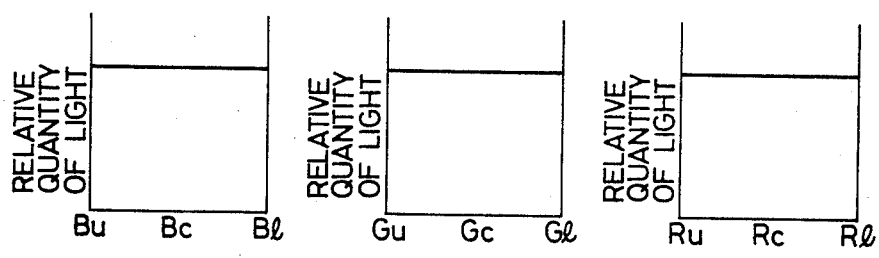
FIGS. 27A–27C show the relative quantity of light distributions at the positions of the light-receiving surfaces of image pick-up tubes.

As described above, considering the relative quantity of light on the light-receiving surface 210b from the length of the optical path and the angle of incidence onto the light-receiving surface 210b, there is provided the rightwardly upward characteristic shown by dot-and-dash line in FIG. 6A, and considering said relative quantity of light with the previously considered rightwardly downward solid line of FIG. 6A added thereto, there is provided the flat characteristic having no inclination as shown in FIG. 27A. This shows that the color shading on the light-receiving surface 210b is eliminated because the relative quantities of light of LBu, LBc and LBl on the light-receiving surface 210b are constant. When the green light ray emergent from any position on the green diffusing surface 213g enters the light-receiving surface 210g, the lengths of the optical paths of the green light rays LGu, LGc and LGl are longer in the order of LGl, LGc and LGu and therefore, conversely, the quantity of light on the light-receiving surface 210g is greater in the order of LGu, LGc and LGl. Also, inferring the quantity of light from the angle of incidence on the light-receiving surface 210g, the quantity of light per unit area is greater in the order of LGu, LGc and LGl because the angle of incidence onto the light-receiving surface 210g is greater in the order of LGl, LGc and LGu. Accordingly, from the length of the optical path and the angle of incidence onto the light-receiving surface 210g, the relative quantity of light on the light-receiving surface 210g has the tendency as indicated by dot-and-dash line in FIG. 6B, and the relative quantity of light on the light-receiving surface 210g is as shown in FIG. 27B, as considered from the solid line and dot-and-dash line of FIG. 6B. Thus, as shown in FIGS. 27A and 27B, the relative quantities of light of the blue wavelength range light and the green wavelength range light on the light-receiving surfaces 210b and 210g are averaged, whereby color shading is prevented.

Further, since the angle of incidence of the red wavelength range light onto the dichroic film 261 of a second prism 206 is small and therefore the color shading thereof is little, the red diffusing surface 213r is disposed between the blue and green diffusing surfaces 213b and 213g. Where it is necessary to prevent the color shading of the red wavelength range light, the red diffusing surface 213r may be displaced slightly toward the blue diffusing surface 213b which tends to create a gradient in the quantity of light across the light-receiving surface 210r in the same manner as those created across surfaces 210b and 210g, whereby the color shading of the red wavelength range light can be prevented. If the color shading of the red wave-length range light is eliminated, the relative quantity of light on the light-receiving surface 210r will be such as shown in FIG. 27C.

Figure 28A:
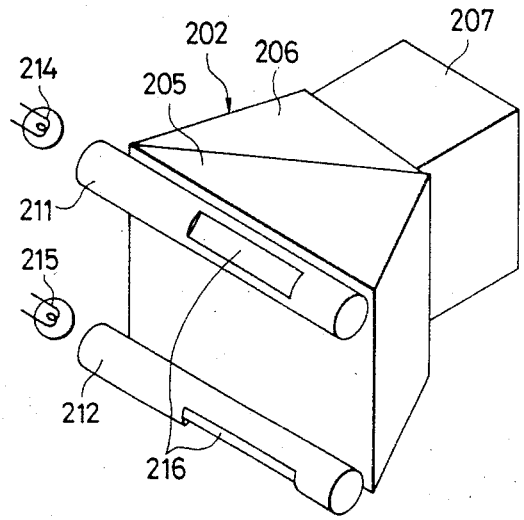
FIG. 28A is a perspective view of a fourteenth embodiment of the present invention.
Figure 28B:
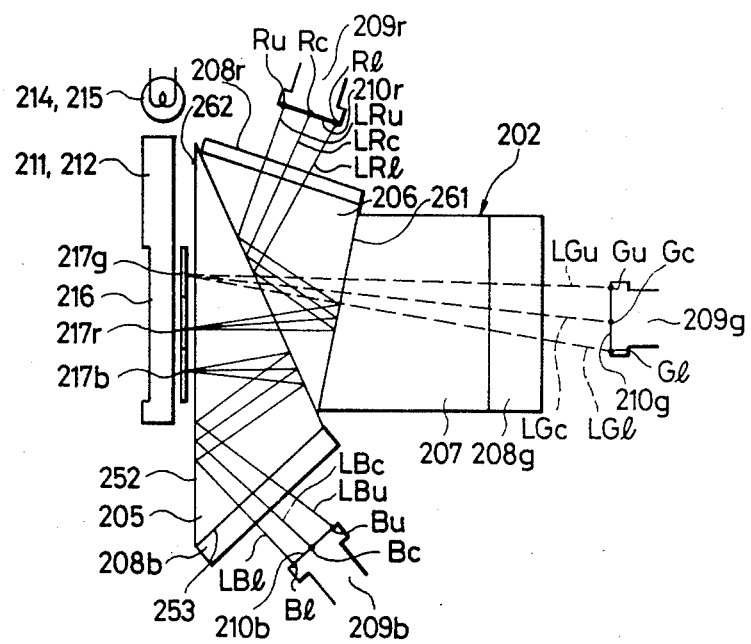
FIG. 28B illustrates the optical path therein.

FIGS. 28A and 28B show a fourteenth embodiment of the present invention. In this embodiment, as shown in FIG. 28A, diffusing surfaces 216 are formed in clad rods 211 and 212 by shaving the side surfaces thereof and painting the shaved portions in white, and as shown in FIG. 28B, in succession from the trimming filter 208r side, arranging color filters 217g, 217r and 217b between the clad rods 211, 212 and a color resolving optical system 202. The color filter 217g is a filter which transmits only the green wavelength range light therethrough, the color filter 217r is a filter which transmits only the red wave-length range light therethrough, and the color filter 217b is a filter which transmits only the blue wave-length range light therethrough.

In the present embodiment having such a construction, the light beams emitted from the bias lamps 214 and 215 are diffused by the diffusing surfaces 216 of the clad rods 211 and 212, whereafter they are transmitted through the color filters 217g, 217r and 217b and thereby separated into three wave-length range lights such as green wavelength range light on the trimming filter 208r side, red wavelength range light in the middle and blue wavelength range light on the trimming filter 208b side, and enter the color resolving optical system 202 from their respective positions. The various wavelength range lights in the color resolving optical system 202, as in the thirteenth embodiment shown in FIG. 26, averagely enter the light-receiving surfaces 210b, 210g and 210r of image pick-up tubes 209b, 209g and 209r, respectively, so that color shading is prevented. Since the color shading of the red wavelength range light is little, the red filter 217r is disposed between the blue and green filters 217b and 217g, but where improvement of the red wavelength range light is necessary, the color filter 217r may be somewhat displaced toward the color filter 217b as previously described.

Figure 29:
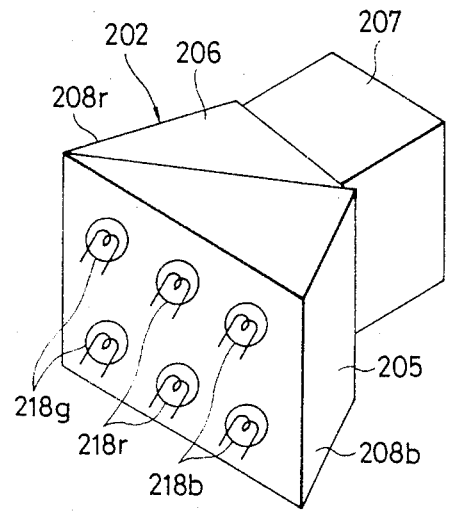
FIG. 29 is a perspective view of a fifteenth embodiment of the present invention.

FIG. 29 shows a fifteenth embodiment of the present invention. In front of a color resolving optical system 202, two green bias lamps 218g are disposed on the trimming filter 208r side, two red bias lamps 218r are disposed in the middle and two blue bias lamps 218b are disposed on the trimming filter 208b side, and respective wavelength range lights are emitted from these bias lamps and enter the color resolving optical system 202. The action in the color resolving optical system 202 is similar to that in the case of the thirteenth or fourteenth embodiment, and there will be no difference in principle even if LEDs are used instead of the bias lamps 218g, 218r and 218b. Further, the bias lamps may be provided outside the optical path and optical fibers having their entrance ends facing the bias lamps may be disposed at predetermined positions so as to transmit light beams therethrough.

Figure 30A:
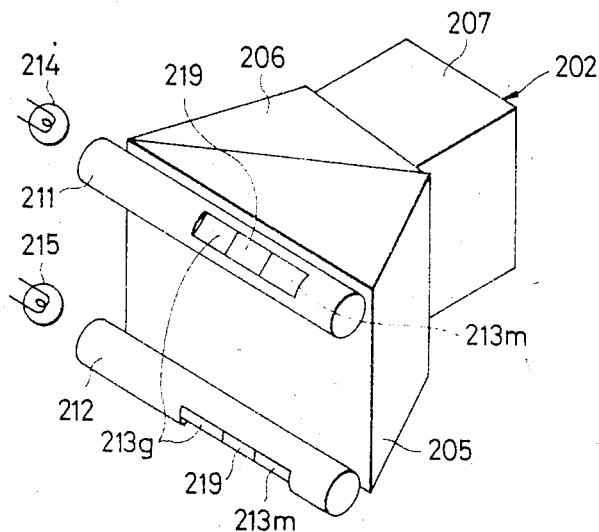
FIG. 30A is a perspective view of a sixteenth embodiment of the present invention.
Figure 30B:
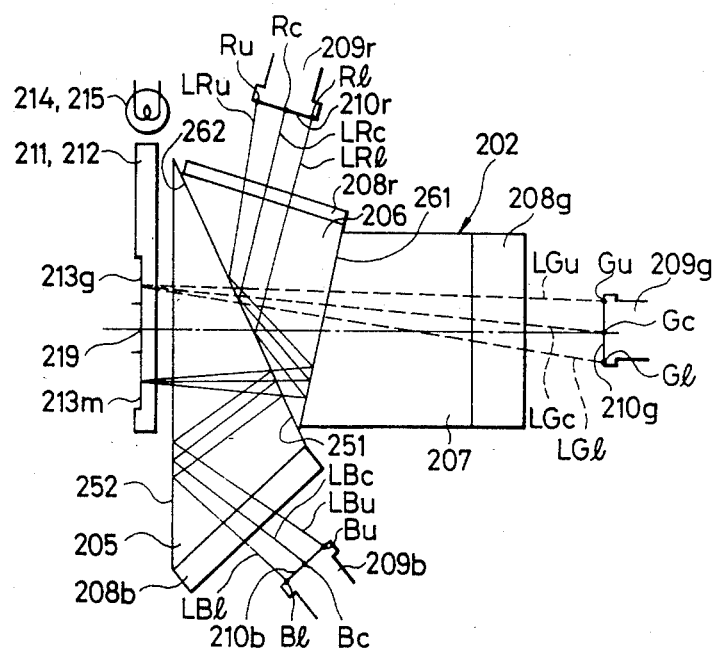
FIG. 30B illustrates the optical path therein.

FIGS. 30A and 30B show a sixteenth embodiment of the present invention. In this embodiment, the red diffusing surfaces 213r of the clad rods 211 and 212 shown in FIG. 26A are made into light absorbing surfaces 219 painted in black and the blue diffusing surfaces 213b are made into magenta diffusing surfaces 213m painted in magenta which is a mixture of red and blue. As shown in FIG. 30B, of the light beams emitted from bias lamps 214 and 215, the green wave-length range light is diffused by the green diffusing surfaces 213g of clad rod films 211 and 212 and enters a color resolving optical system 202, and then enters a light-receiving surface 210g as in the thirteenth embodiment. The blue and red wavelength range lights are diffused by the magenta diffusing surfaces 213m and enter the color resolving optical system 202, and then are directed to respective light-receiving surfaces 210b and 210r. In this case, the blue wavelength range light enters the light-receiving surface 210b just as in the thirteenth embodiment because the magenta diffusing surfaces 213m lie at the same positions as the blue diffusing surfaces 213b in the thirteenth embodiment. Also, when the red wavelength range lights LRu, LRc and LRl diffused by any point on the magenta diffusing surfaces 213m enter the light-receiving surface 210r, the lengths of the optical paths are longer in the order of LRu, LRc and LRl and the quantity of light on the light-receiving surface 210r is greater in the order of LRl, LRc and LRu. Further, the angles of incidence of the respective light rays onto the light-receiving surface 210r are greater in the order of LRu, LRc and LRl and therefore, the quantity of light per unit area is greater in the order of LRl, LRc and LRu. Accordingly, considering the relative quantity of light on the light-receiving surface 210r from the length of the optical path and the angle of incidence onto the light-receiving surface 210r, there is provided the characteristic indicated by dot-and-dash line in FIG. 6C, as previously described. In this case, the relative quantity of light on the light-receiving surface 210r is synthesized from the solid line and dot-and-dash line of FIG. 6C as shown in FIG. 27C and become constant and averaged at each position on the light-receiving surface 210r. Accordingly, the present embodiment is effective when it is necessary to eliminate also small color shading of the red wavelength light.

Figure 31:
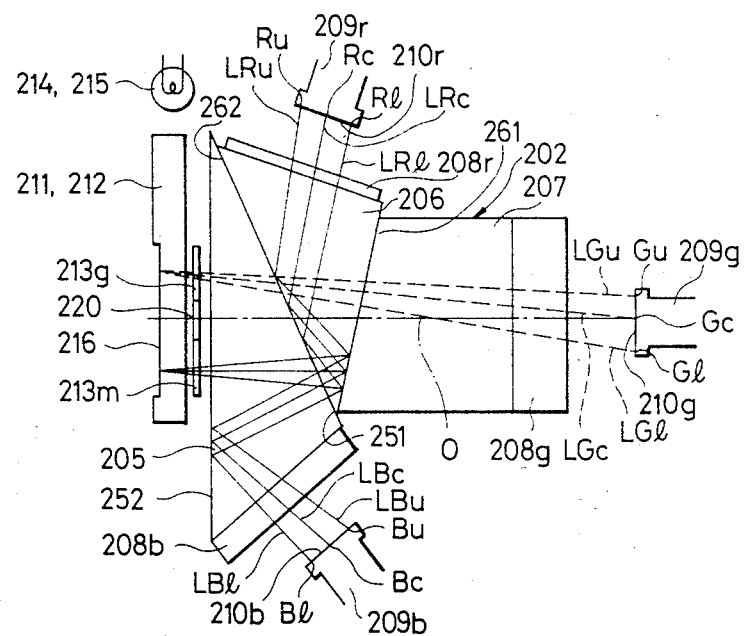
FIG. 31 illustrates the optical path in a seventeenth embodiment of the present invention.

FIG. 31 shows a seventeenth embodiment of the present invention. In this embodiment, an opaque screen 220 intercepting all wavelength range lights is provided instead of the color filter 217r in the embodiment shown in FIG. 28A, and a magenta color filter 213m is disposed instead of the color filter 217b. Again in the present embodiment, the light beams emitted from bias lamps 214 and 215 are diffused by the white diffusing surfaces 216 of clad rods 211 and 212 and transmitted through color filters 213g, and 213m and enter a color resolving optical system 202.

Figure 32:
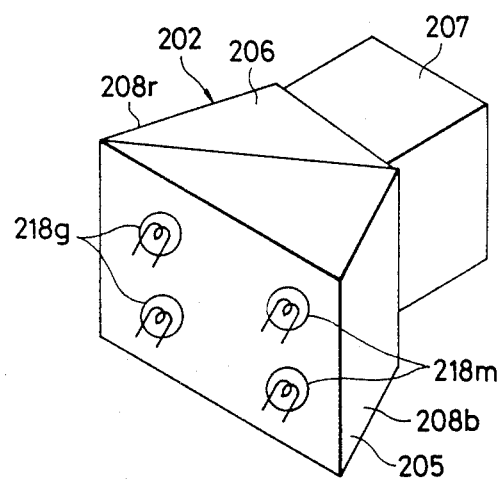
FIG. 32 is a perspective view of an eighteenth embodiment of the present invention.

FIG. 32 shows an eighteenth embodiment of the present invention. In this embodiment, on the upper and lower portions of the front of a color resolving optical system 202, two green bias lamps 218g are disposed on the trimming filter 208r side and two magenta bias lamps 218m are disposed on the trimming filter 208b side. The wavelength range lights emitted from these bias lamps 218g and 218m enter the color resolving optical system 202 and reach light-receiving surfaces 210b, 210r and 210g in the same manner as the optical path shown in FIG. 31.

We claim:
1. A television camera comprising:
an objective lens system;
color resolving optical means for cooperating with said objective lens system to form a plurality of colored images, said color resolving optical means having at least one dichroic film;

a plurality of image receiving means for receiving respective colored images formed by said color resolving optical means; and illuminating means for independently illuminating said plurality of image receiving means through said color resolving optical means by component light beams each comprised of a plurality of diverging light rays which strike said dichroic film at different angles of incidence, said component light beams having different respective wavelength ranges, each said range being sufficiently narrow that color shading due to the different angles of incidence of said plurality of diverging light rays relative to said dichroic film is substantially eliminated.

2. A television camera according to claim 1, wherein said illuminating means has quantity of light varying means for varying the quantity of light of at least one of said component light beams.

3. A television camera according to claim 2, wherein said quantity of light varying means is a filter.

4. A television camera according to claim 2, wherein said quantity of light varying means is a variable resistor.

5. A television camera according to claim 1, wherein the positions at which said component light beams are emitted differ from each other.

6. A television camera comprising:

color resolving optical means for color resolution and for forming a plurality of optical paths, said color resolving optical means having at least one dichroic film;

a plurality of image receiving means disposed in each of said optical paths for receiving an image and converting the image into an electrical signal; and illuminating means for illuminating said plurality of image receiving means through said color resolving optical means by a plurality of component light beams having different spectral characteristics from each other, wherein the positions at which said component light beams are emitted differ from each other.

7. A television camera according to claim 6, wherein each of said component light beams is produced from three light-emitting portions arranged in the order of green, red and blue.

8. A televison camera according to claim 6, wherein each of said component light beams is produced from two light-emitting portions arranged in the order of green and a mixture of red and blue.

* * * * *